July 7, 1942.  W. T. ROSSELL ET AL  2,289,144
VEHICLE
Filed Aug. 3, 1940  2 Sheets-Sheet 1
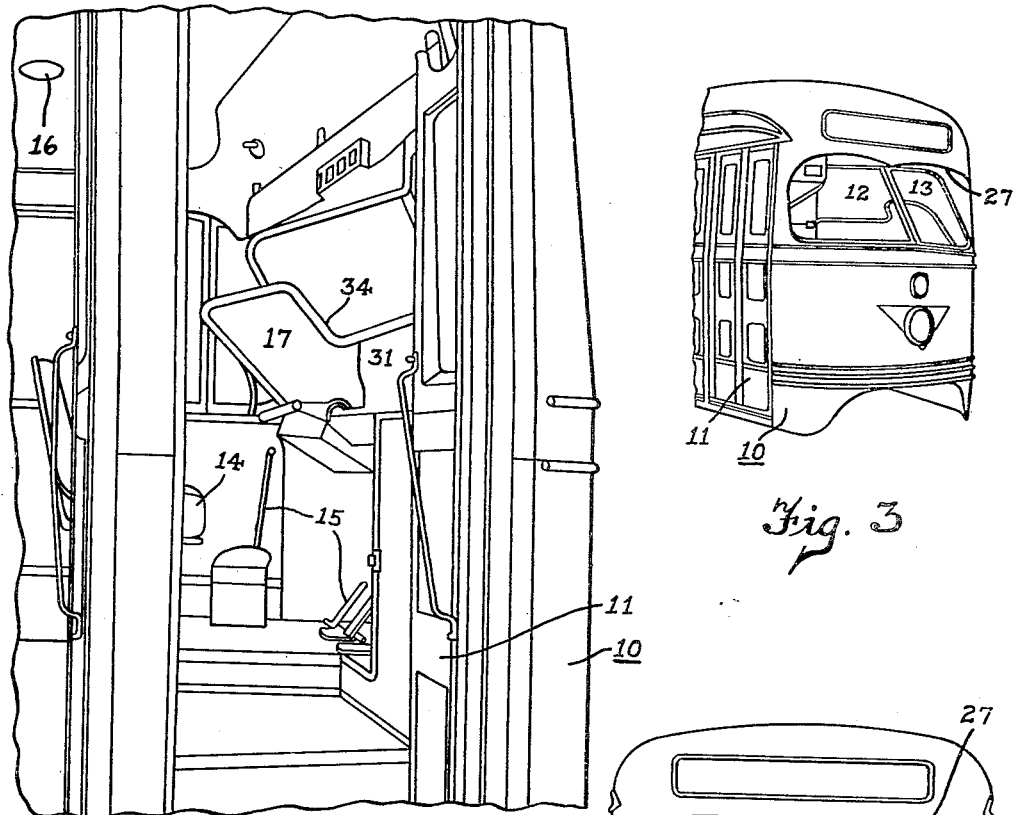
Fig. 1
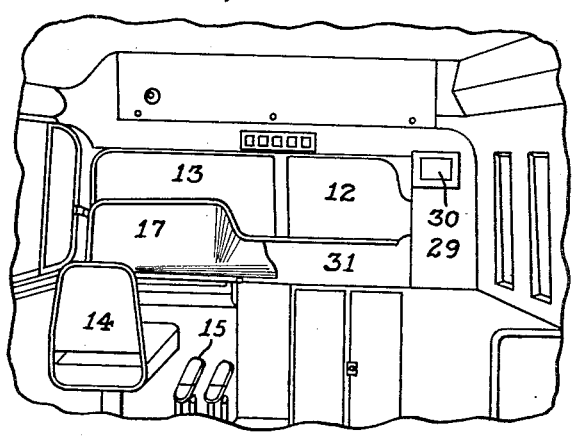
Fig. 2
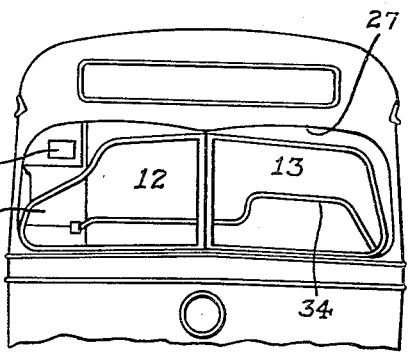
Fig. 3
Fig. 4
Inventor
William T. Rossell,
Francis W. Shepard, and
Harry J. Bader
By
Maréchal & Vie
Attorneys July 7, 1942.  W. T. ROSSELL ET AL  2,289,144
VEHICLE
Filed Aug. 3, 1940  2 Sheets-Sheet 2
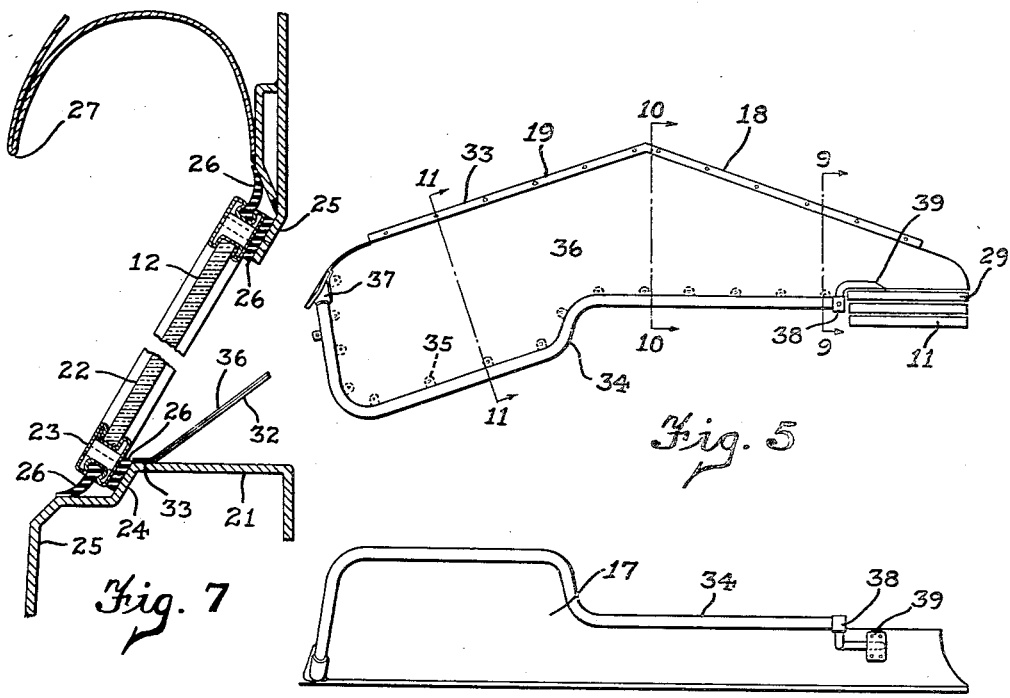
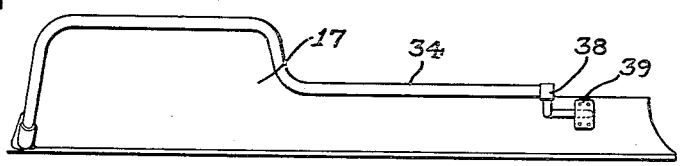
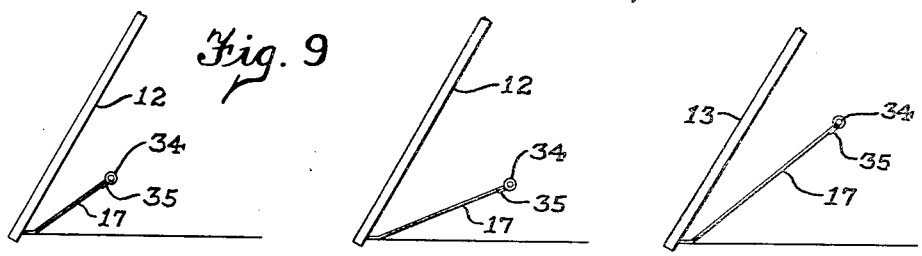
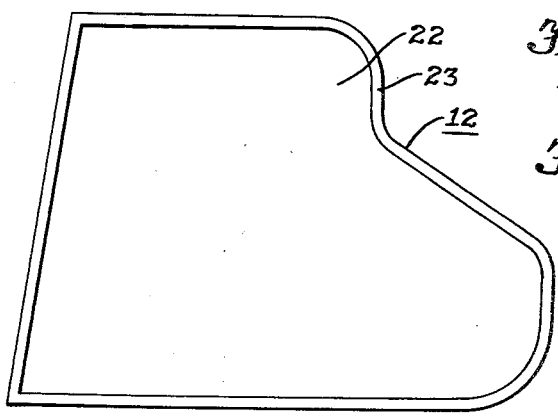
Inventors
William T. Rossell,
Francis W. Shepard, and
Harry L. Blader
By Maréchal & Noe
Attorneys Patented July 7, 1942

2,289,144

UNITED STATES PATENT OFFICE 2,289,144

VEHICLE

William T. Rossell, University City, Mo., Francis H. Shepard, New Rochelle, N. Y., and Harry J. Bader, Troy, Ohio, assignors to St. Louis Public Service Company, St. Louis, Mo., a corporation of Missouri Application August 3, 1940, Serial No. 350,991

12 Claims. (Cl. 296—84)

This invention relates to vehicles, and more particularly to a vehicle windshield arrangement preventing glare into the eyes of the operator.

One object of the invention is the provision, in a vehicle, of a downwardly and outwardly inclined window which is of substantially flattened V shape as viewed from above through which the traffic is viewed by the operator, and a light shield or shadow apron extending upwardly and rearwardly from the lower portion of the window and of such form and angular arrangement as to block from the window all light rays passing toward the window from the vehicle interior that would otherwise reflect to the operator's eyes from the useful vision zone of the window.

Another object is the provision of a window and light shield of the character mentioned, in which the portion of the shield immediately in front of the operator is of a greater height and greater angular inclination than the portions of the light shield which are adjacent the right-hand section of the window with the height and angular relation such as to eliminate all confusing reflection from the windshield into the operator's eyes.

Another object is the provision of a light shield inclining upwardly and rearwardly from the lower portion of the inclined front window, the light shield, at an upper portion thereof, ending in a rigid rail serving as a grab rail for passengers.

Another object is the provision of a vehicle having a forwardly inclined front window of substantially flattened V shape as viewed from above and arranged in front of the driver's location, and having a light shield of such form and so angularly related to the front window as to eliminate all confusing reflection and glare in the driver's eyes from the zone of the window through which he has a useful vision of the entire street ahead of the vehicle, the arrangement being such that the light shield, although of large lateral extent, does not reduce the available space within the car or require an increase in the car length.

Another object of the invention is the provision of a windshield and shadow apron arrangement in a vehicle, in which the windshield inclines rearwardly at quite an abrupt angle to the vertical, the upper outer corner of the right-hand window being recessed or omitted to afford room for reception of the opened front side door of the vehicle so that a full range of normal useful vision is obtained without requiring an extension in the length of the vehicle or the reduction of the passenger carrying space inside of the vehicle.

Other objects and advantages of the invention will be apparent from the following description, the appended claims, and the accompanying drawings.

In the drawings,

Fig. 1 is a perspective view looking through the open door into the interior of a vehicle in which the present invention is embodied;

Fig. 2 is a perspective view looking towards the windshield from the interior of the vehicle;

Fig. 3 is a perspective exterior view of the front of the vehicle;

Fig. 4 is a perspective view of the upper portion of the vehicle front;

Fig. 5 is a plan view looking downwardly on the shadow apron;

Fig. 6 is a rear elevation of the shadow apron;

Fig. 7 is a vertical sectional view taken longitudinally of the vehicle through the windshield and its associated parts;

Fig. 8 is a view of the front right window section;

Fig. 9 is a vertical section on the line 9—9 of Fig. 5, through the windshield and the shadow apron;

Fig. 10 is a section on the line 10—10 of Fig. 5; and

Fig. 11 is a section on the line 11—11 of Fig. 5.

Referring more particularly to the drawings, in which the preferred embodiment of the invention has been illustrated in connection with the front windshield of a street car or bus, 10 generally designates the car body structure, which is provided with a suitable door 11, shown closed in Fig. 3 and open in Fig. 1, and providing for the entrance or exit of passengers. At the front of the vehicle is a windshield, comprising the right-hand and left-hand window sections 12 and 13, respectively, through which the driver views the traffic ahead of the car. A seat 14 is provided for the driver, in back of the left-hand window section and adjacent suitable car controlling devices 15. The interior of the vehicle, as is customary in street cars, busses, and the like, is provided below the roof and back of the driver with suitable lamps 16 for brightly illuminating the interior.

In the windshield arrangement in some street cars the windshield has had a slight inclination to the vertical, or the right-hand and left-hand window sections have been arranged at a small relative angle so as to extend back from a forward apex. In some cases a curtain has been employed just back of the driver's location. However in such arrangements there has been no adequate provision preventing glare and confusing reflection of objects inside the vehicle into the eyes of the driver, resulting from the brightly illuminated car interior and the mirror effect of the windshield in night operation. These reflections may result in what appears to be a distinct object ahead of the vehicle, or a movement of some sort requiring the driver's attention, and also reduces the visibility of the objects or persons that actually are ahead.

In accordance with the present invention, the windshield is so arranged and so associated with a light shield or shadow apron, designated by the reference numeral 17, as to prevent light rays coming from the brightly illuminated car interior, either directly from the lamp or reflected from some light colored object within the vehicle, from striking any point of the windshield through which the driver has a useful vision of the entire street or road ahead and reflecting back into the eyes of the operator or driver. This construction is such as not to require a curtain just back of the driver's location, and the parts are so arranged that no addition to the car length is required and no reduction in the available passenger holding space inside the vehicle is produced. The windshield sections slope upwardly and rearwardly at a very considerable angle of about 30° to the vertical, or at an angle somewhat in excess of 30°, and the right-hand and left-hand window sections incline rearwardly and laterally with respect to one another at a very substantial relative angle indicated by the lines 18 and 19, see Fig. 5. The light shield or shadow apron 17 extends upwardly from the lower end of the windshield with an angle of inclination, an upward extent, and a lateral width so coordinated with the windshield as to block the passage of light rays coming from the car interior that might reflect from the windshield into the eyes of the driver as he views any part of the road ahead. The light shield, which has a non-reflecting upper surface, preferably of black mohair or other suitable light absorbing material, absorbs those light rays coming from the car interior to the windshield and reflected downwardly because of the considerable rearward inclination of the glass onto the light shield and thus prevents their further travel. By reason of the considerable angle of inclination of the windshield in two directions, viz., rearwardly upwardly and rearwardly laterally, and the associated light shield, the driver has a full range of vision of all parts of the road ahead, without glare and without the confusion resulting from some light colored moving object within the vehicle.

The windshield, as will be apparent from the drawings, extends upwardly and rearwardly from the sill or shelf portion 21 of the car structure, each windshield section comprising a glass panel 22 contained in a peripheral metal frame 23 which is connected by suitable attaching screws or bolts to downwardly inclined wall portions 24 and 25 of the car body. Suitable rubber sealing strips 26 are provided to make the connection watertight. The top of the windshield is located some distance to the rear of the overhanging forward end 27 of the roof.

The right-hand windshield section 12, at its upper right-hand corner portion, is inwardly recessed or cut away, as will be seen from Fig. 8, since vision through this particular corner of the windshield is never required and by omitting this particular portion of the windshield, the front door of the car may be swung open without interference between the upper portions of the doors and the rearwardly extending upper portion of the windshield in spite of the considerable angle of the windshield to a vertical plane. The front door may open flat against the transverse wall or panel 29 extending transversely of the vehicle and upwardly to the rear of the right-hand portion of the windshield and in a plane which intersects the windshield. The cut-out portion or recess in the upper right-hand corner of the right window permits this wall 29 to extend up as high as the top of the door without interference with the windshield itself. The upper portion of this wall 29 serves as a support for the route indicator 30 which is arranged in the space provided by recessing or omitting the upper corner of the right windshield section. Thus the route indicator, which shows a route number to people on the street, is positioned in such a location that it will not reduce any useful portion of the driver's range of vision.

The wall or panel 29 constitutes an auxiliary portion of the light shield 17 and prevents the light rays from reflecting back to the driver's eyes from the right-hand end of the windshield throughout its entire height. The forward side of this wall or panel 29 is a non-reflecting surface.

The light shield or shadow apron comprises a sheet metal plate 32 having a horizontal flange 33 connected by suitable screws to the sill portion 21 of the car structure, the plate 32 inclining upwardly and rearwardly and being fastened to a rigid bar or metal tube 34 which is provided with ears 35 welded to the tube and underlying the upper portion of the plate 32, and connected to it by means of suitable screws. Suitably fastened to the upper side of the plate 32 is the light absorbing covering 36. The right-hand end portion of the plate extends in front of the wall 29.

The tube 34 is provided with a connection socket or bracket 37 secured to the car structure adjacent the lower left-hand end of the windshield. The opposite end of the tube is provided with a bracket 38 including an attaching plate 39 which is screwed to the rear side of the wall 29. Thus the two supporting means at the opposite ends of the tube hold the latter rigidly in its proper position, with the right-hand portion of the tube extending in a generally horizontal direction near the door entrance in a position so that it may be used as a grab rail for persons entering or leaving the car. A plate or wall 31 is preferably attached to the right-hand portion of the tube 34 and extends down to the end of the sill 21, forming a continuation of the wall 29.

The light shield, as will be apparent from the drawings, is of substantially greater height in front of the driver's location than the body portion of part 17 which is adjacent the right-hand window section at the left of the auxiliary wall portion 29, the tube being curved or bent near its center so that the right-hand portion of the tube extends substantially horizontally in a plane that is somewhat lower than the plane containing the high part in front of the driver. This portion of the tube in front of the driver is a little below the level of the driver's eyes when the driver is in the seat 14 in normal driving position, and the angle of inclination of the portion of the light shield in front of the driver is quite steep, as shown in Fig. 11, inclining upwardly in a plane that meets the driver's eyes so that the driver, in normal driving position, has a full range of vision through the lower portion of the windshield, when looking downwardly, and of course he can look over the top of the tube 34 when looking ahead substantially in a horizontal direction. The upward extent of this portion of the light shield is such as to prevent the reflection into the driver's eyes of all light rays, regardless of their direction, coming from the interior of the vehicle and passing over the top of the tube 34 to the left-hand windshield section, as this portion of the shadow apron has an acute angle relationship to the windshield and has a height so coordinated with size and angle of the windshield that light rays extending generally in a horizontal direction or inclining upwardly towards the light shield are blocked off from the windshield, and those light rays that incline downwardly past the tube 34 and striking the upper portions of the left-hand windshield section will be reflected back to some point below the eyes of the driver. With the glare elimination resulting from the considerable rearward inclination and lateral inclination of the windshield itself, the shadow apron is effective to completely eliminate glare and reflections from this windshield section resulting from the brightly lighted interior of the vehicle.

The portion of the light shield back of the right-hand windshield section inclines at a somewhat more gradual angle and is of smaller height than the portion immediately in front of the driver as indicated in Figs. 9 and 10, but the angle of inclination and the extent of this right-hand portion of the light shield is sufficient to prevent reflection into the eyes of the driver of those light rays that would strike the right-hand windshield section at any point below the zone through which the driver views any part of the road ahead. This right-hand portion of the light shield, although of smaller vertical and rearward extent, is fully effective in preventing objectionable reflections as the driver's eyes are considerably more remote from the right-hand windshield section. If any stray light rays are reflected towards the driver from the upper right-hand portion of the right-hand windshield section they would have no adverse effect on the driver since such reflections would come from points towards which the driver does not look in the normal operation of the car. It will also be noted that the wall or panel 29 having a non-reflecting forward surface and arranged back of the entire right-hand end of the windshield prevents light rays from striking any part of the right-hand windshield section at such angle as to be reflected back to the eyes of the driver over the lower right-hand part of the tube 34, and permits clear vision in a downward angular direction through the right-hand end of the windshield to view passengers about to enter the car. By reason of the reduced height and extent of the right-hand portion of the light shield, so coordinated with the windshield construction as to be fully effective in the prevention of objectionable reflections, the latter offers no obstruction in the useful passenger carrying space of the car and does not require a car of additional length to accommodate the arrangement. Although the windshield is inclined upwardly at a considerable rearward angle, no increase in car length is required, and the door, when opened, may have the same location as if the windshield were vertical or slightly inclined. The lower front portion of the car, below the windshield, may extend downwardly substantially vertically from the bottom of the windshield as shown in Figs. 1 and 3 so that the car length may be kept within desired limits without reduction in the available car space inside the vehicle.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a vehicle having means for illuminating the interior and having an operator's location, a downwardly and outwardly inclined window of substantially flattened V plan form adjacent the operator's location, and a light shield having a non-reflecting upper surface and extending upwardly and rearwardly towards the operator's location from the lower end of the window and so coordinated as to height and angle of inclination with the angles and extent of the window as to block from the window all light rays directed toward the window from the vehicle interior that would otherwise reflect to the operator's eyes from the zone through which the driver has complete view of the road.

2. In a vehicle having an operator's location at a forward portion, a downwardly and forwardly inclined front window of substantially flattened V plan form in front of the operator's location with the apex of the V at the right of the operator's location, the outline of the upper right portion of the right window section defining a recess, and a light shield extending upwardly and rearwardly from the lower end of the window to a point in front of and just below the position of the eyes of an operator in the operator's location, and so coordinated as to extent and angle with the angles of the window as to block from the window all light rays directed toward the window from the vehicle interior that would otherwise reflect to the operator's eyes from the zone through which he has complete view of the road ahead.

3. A vehicle comprising a body having a driver's location at a forward portion, a right front door, means for illuminating the interior of the body, a downwardly and forwardly inclined front window of substantially flattened V plan form in front of the driver's location with the apex of the V at the right of the driver's location, the outline of the upper right portion of the right window section defining a recess leaving room for the opened right front door, and a light shield having a light-absorbing upper surface and extending from one side of the window to the other and projecting upwardly and rearwardly from the lower end of the window to an extent sufficient to block from the window all light rays directed toward the window from the vehicle interior that would produce objectionable reflections in the driver's eyes.

4. A vehicle comprising a body having a driver's location at a forward portion, a right front door, means for illuminating the interior of the body, a downwardly and forwardly inclined front window of substantially flattened V plan form in front of the driver's location with the apex of the V at the right of the driver's location, the outline of the upper right portion of the right window section defining a recess leaving room for the opened right front door, and a light shield having a non-reflecting upper surface and extending substantially from one side of the window to the other and projecting upwardly and rearwardly from the lower end of the window to an extent sufficient to block from the window light rays directed toward the window from the vehicle interior, the light shield, at the right hand side of the window extending upwardly and rearwardly to a lesser extent than at the left hand side and terminating in a grab rail adjacent the door.

5. A vehicle comprising a body having a driver's location at a forward portion, a right front door, means for illuminating the interior of the body, a downwardly and forwardly inclined front window of substantially flattened V plan form in front of the driver's location with the apex of the V at the right of the driver's location, and a light shield having a non-reflecting upper surface and extending substantially from one side of the window to the other and projecting upwardly and rearwardly from the lower end of the window to an extent sufficient to block from the window all light rays directed toward the window from the vehicle interior that would otherwise produce objectionable reflections in the driver's eyes, the light shield, at the right-hand side of the window extending upwardly and rearwardly to a lesser extent than at the left-hand side and terminating in a grab rail adjacent the door.

6. In a vehicle having means for illuminating the interior and having a driver's location at a forward portion, a downwardly and forwardly inclined front window of substantially flattened V plan form in front of the driver's location with the apex of the V at the right of one side of the driver's location, and a light shield having a non-reflecting upper surface and extending substantially from one side of the window to the other and terminating in a substantially upright wall back of the right-hand portion of the right-hand window section, said light shield projecting upwardly and rearwardly from the lower end of the window to such extent and angle, coordinated with the angles of the window, as to block from the window all light rays directed toward the window from the vehicle interior that would otherwise produce reflections in the driver's eyes from the zone through which he has complete view of the road.

7. In a vehicle having a driver's location and means to the rear of the driver's location for illuminating the interior, a window providing vision for the driver and arranged at an inward upward inclination with one upwardly extending edge substantially more remote from the driver than the other, and means for blocking from the window all light rays directed toward it from the vehicle interior that would otherwise reflect to the driver's eyes from a zone through which the driver has useful vision in his operation of the vehicle and comprising a main body portion extending upwardly and inwardly towards the driver from a location adjacent the lower portion of the window and an auxiliary wall portion arranged inwardly of that side of the window most remote from the driver and reaching upwardly to such extent above the main body portion as to give glare-free vision from the driver's location through such remote side up to the top thereof.

8. In a vehicle having means for illuminating the interior and having a driver's location at a forward portion, a downwardly and forwardly inclined front window of substantially flattened V plan form in front of the driver's location with the apex of the V at the right side of the driver's location, and a light shield having a non-reflecting upper surface and extending substantially from one side of the window to the other and projecting upwardly and rearwardly from the lower end of the window to an extent sufficient to block from the window all light rays directed toward the window from the vehicle interior that would otherwise reflect to the driver's eyes as he views the road ahead, said shield at an upper portion thereof ending in a rigid rail serving as a grab rail for passengers.

9. In a vehicle having means for illuminating the interior and having a driver's location at a forward portion, a downwardly and forwardly inclined front window of substantially flattened V plan form in front of the driver's location with the apex of the V at one side of the driver's location, and a light shield having a non-reflecting upper surface and extending substantially from one side of the window to the other and projecting upwardly and rearwardly from the lower end of the window, said shield on the side of the window in front of the driver having a greater rearward extent than a portion thereof at the other side, and having a greater height than the end portion of the light shield at such other side, said shield at the side of the window in front of the driver extending in substantial alignment with the position of the eyes of the driver, the extent and angle of the right and left portions of the shield being so coordinated with the windshield inclination and forward V angle as to block from the window all light rays directed toward the window from the vehicle interior that would otherwise produce objectionable reflections in the driver's eyes.

10. In a vehicle having a driver's location at a forward portion, a downwardly and forwardly inclined front window of substantially flattened V plan form in front of the driver's location with the apex of the V at one side of the driver's location, and a light shield having a non-reflecting upper surface and extending substantially from one side of the window to the other and projecting upwardly and rearwardly from the lower end of the window in front of the driver in substantial alignment with the position of the eyes of the driver, said shield having a greater rearward extent and a greater angle of inclination on the side of the window in front of the driver, and projecting from the lower end of the window to an extent sufficient to block from the window substantially all light rays directed toward the window from the vehicle interior that would otherwise reflect rearwardly to the driver's eyes from the zone through which the driver has full vision of the complete road ahead of the vehicle.

11. In a vehicle having means for illuminating the interior and having a driver's location at a forward portion, a downwardly and forwardly inclined front window of substantially flattened V plan form in front of the driver's location with the apex of the V at one side of the driver's location, and a light shield having a non-reflecting upper surface and extending substantially from one side of the window to the other and projecting upwardly and rearwardly from the lower end of the window and of greater rearward extent on the side of the window in front of the driver, said shield, on the side of the window in front of the driver, projecting from the lower end of the window to a point closely adjacent and just below the driver's eyes, the extent and angle of the light shield being so coordinated with the angles of the window sections as to block from the window all light rays directed toward the window section in front of the driver from the vehicle interior.

12. In combination, in a vehicle having a driver's location at a forward portion thereof, a front window of substantially flattened V-plan form in front of the driver's location with the apex of the V at the right of the driver's location, said window having a downward and forward inclination at an angle of about 30° to the vertical, and the stationary light shield having a non-reflecting upper surface and extending substantially from one side of the window to the other, said light shield projecting upwardly and rearwardly from the lower portion of the window in substantial alignment with the position of the driver's eyes and terminating in front of the driver just below the level of the position of his eyes, the height of the window being such that any light rays from within the vehicle reflected from the upper portions of the window will travel below the location of the driver's eyes, and the height and angle of inclination of the light shield being such that the light shield blocks from the window those light rays directed upwardly toward the window from within the interior of the vehicle that would otherwise reflect from the window to the driver's eyes.

WILLIAM T. ROSSELL.
FRANCIS H. SHEPARD.
HARRY J. BADER.